Oct. 30, 1956  F. B. VAVRINEK  2,768,445
DIAL INDICATOR STOP FOR CROSS SLIDE OF LATHE
Filed July 7, 1954  2 Sheets-Sheet 1
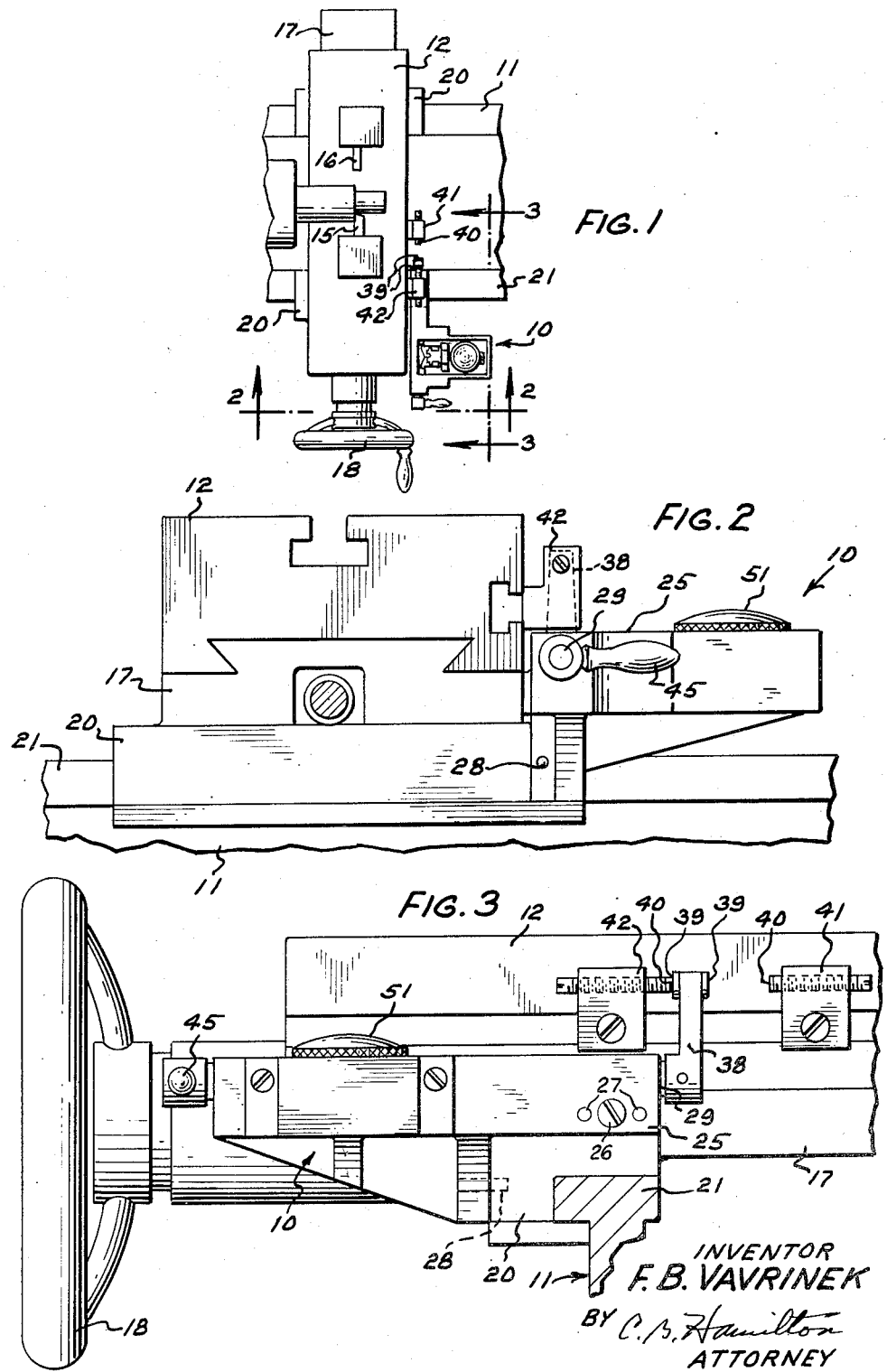

Oct. 30, 1956  F. B. VAVRINEK  2,768,445
DIAL INDICATOR STOP FOR CROSS SLIDE OF LATHE
Filed July 7, 1954  2 Sheets-Sheet 2

INVENTOR
F. B. VAVRINEK
BY C. B. Hamilton
ATTORNEY

United States Patent Office 2,768,445
Patented Oct. 30, 1956

2,768,445

DIAL INDICATOR STOP FOR CROSS SLIDE OF LATHE

Frank B. Vavrinek, Downers Grove, Ill., assignor to Western Electric Company, New York, N. Y., a corporation of New York Application July 7, 1954, Serial No. 441,887

7 Claims. (Cl. 33—125)

This invention relates to a dial indicator stop device for a cross slide of a lathe and more particularly to a device for accurately indicating the position of the cross slide of a lathe as it is moved into predetermined zones in opposite directions.

An object of the invention is to provide a device for accurately indicating the positions of a reciprocable body as it is moved into predetermined zones in opposite directions.

It is a further object of the invention to provide a dial indicator stop device for the cross slide of a lathe to indicate the position of the cross slide as it is moved into predetermined zones in opposite directions.

A device illustrating certain features of the invention may include a housing fixed to a guide plate on which the cross slide is mounted and having a rod supported for longitudinal movement therein and yieldably retained in a fixed position therein. The rod has an arm thereon engageable with a pair of adjustable stops on the cross slide in response to movement of the cross slide in opposite directions to predetermined positions. A dial indicator supported by the housing is interconnected with the rod through a pair of oscillatable bell crank motion-transmitting members for actuating the dial in response to axial movement of the rod in either direction to accurately indicate the position of the cross slide as it is moved into predetermined zones in response to movement in opposite directions.

Figure 5:
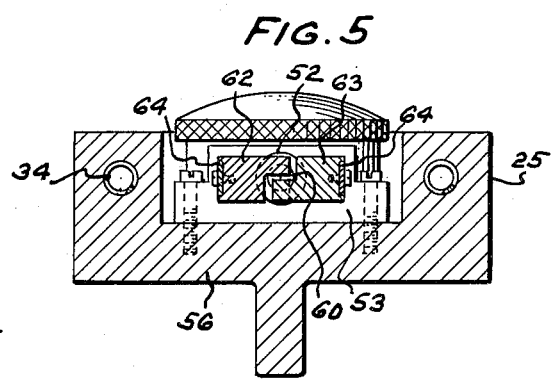
Figure 4:
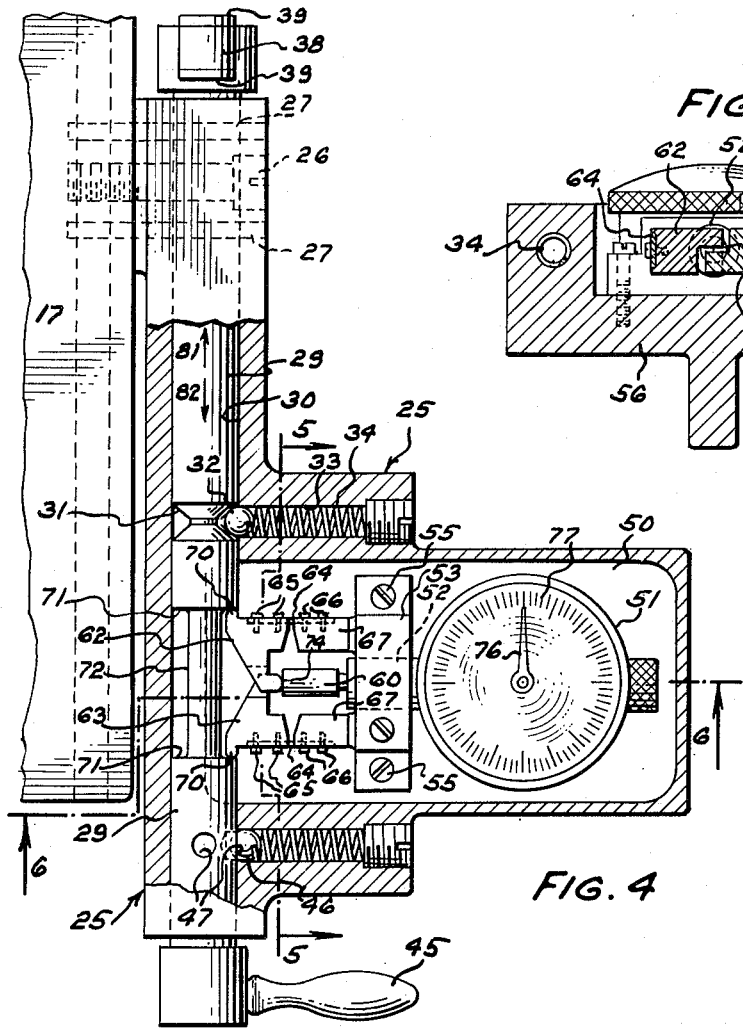
Figure 6:
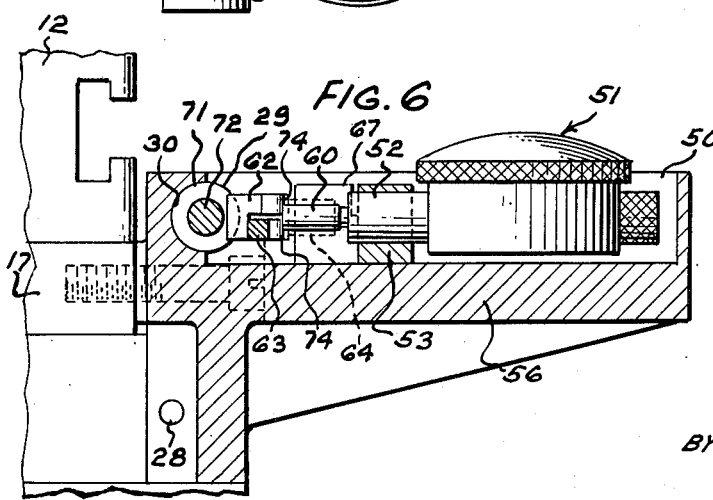

Other objects and advantages of the invention will become apparent by reference to the following detailed description and the accompanying drawings illustrating a preferred embodiment thereof, in which Fig. 1 is a fragmentary plan view of a lathe with the invention applied thereto;

Figs. 2 and 3 are enlarged fragmentary sectional views taken on the lines 2—2 and 3—3, respectively, of Fig. 1;

Fig. 4 is an enlarged plan sectional elevational view of the dial indicator stop device; and Figs. 5 and 6 are vertical cross-sectional views taken on the lines 5—5 and 6—6, respectively, of Fig. 4.

Referring to Fig. 1 of the drawings, 10 indicates the dial indicator stop device applied to a lathe 11 for accurately indicating the position of the cross slide 12 and a pair of cutting tools 15 and 16 thereon as they are moved in opposite directions into predetermined zones. The cross slide 12 is guided for reciprocable movement on a base plate 17 and is manually actuated under control of a hand wheel 18. The base plate 17 has a pair of shoes 20, which ride on ways 21 of the lathe.

The dial indicating stop device 10 comprises a housing 25 secured to the base plate 17 by a screw 26 and a pair of dowels 27 and is supported on the shoe 20 by a dowel 28. A rod 29 is supported in a bore 30 in the housing 25 for axial reciprocation in a direction parallel to the movement of the cross slide 12. An annular V-shaped groove 31 in the rod 25 is adapted to receive a metal ball detent 32 therein which is disposed in a bore 33 of the housing 25 and is urged into engagement with the groove 31 by a spring 34 for yieldably retaining the rod 29 in a predetermined position and against axial movement.

An arm 38 fixed to one end of the rod 29 has a pair of oppositely disposed stop surfaces 39 thereon adapted to engage stop surfaces 40—40 on a pair of adjustable screws which are mounted in threaded apertures in a pair of stop elements 41 and 42 adjustably secured to the cross slide 12 for limiting the extent of movement of the cross slide to accurately position the tools 15 and 16 relative to the work.

At its opposite end, the rod 29 has a handle 45 fixed thereto by means of which the rod may be turned to swing the arm 38 from a vertical position in the path of the stops 41 and 42 to horizontal position to render the dial indicating stop device 10 inoperable. A spring-pressed detent 46 cooperating with a pair of recesses 47 in the rod 29 angularly disposed relative to each other serve to yieldably maintain the rod and the stop arm 38 in angularly adjusted positions.

The housing 25 is shaped to provide an enlarged recess 50 for receiving a dial indicator 51. The casing of the dial indicator 51 has a tubular extension 52 which is clamped in an aperture in a split mounting block 53 which is fastened by a pair of screws 55 to a horizontally disposed wall portion 56 of the housing 25. The stem 60 of the dial indicator 51, which is mounted for slidable movement within the tubular extension 52 is disposed at right angles to the axis of the rod 29 and is interconnected with the rod 29 by a pair of oscillatable bell crank motion-transmitting elements 62 and 63 for translating the longitudinal movement of the rod 29 to the stem 60 and the dial indicator 51. The bell crank elements 62, 63 are individually mounted for oscillatable movement on reeds in the form of flat leaf springs 64 secured by screws 65 to the bell cranks and by screws 66 to lugs 67 formed on the block 53. Rounded ends 70 on the bell crank elements 62, 63 are disposed in opposite directions to each other in engagement with shoulders 71—71 formed on the rod 21 by a reduced portion 72 thereof and rounded ends 74 of the bell crank elements engage the end surface of the stem 60 of the dial indicator 51 whereby, in response to axial movement of the rod 29 in either direction, the bell crank elements 62, 63 serve to translate this longitudinal movement into a transverse motion to actuate the stem 60 of the dial indicator 51. The dial indicator 51, which is of a well known type, has a pointer 76 rotatable in response to movement of the stem 60 and cooperable with graduations 77 for indicating movement of the cross slide 12 and the tools thereon to .00025".

With the above-described dial indicator stop device 10, the tools 15 and 16 may be set up on the cross slide 12 and the adjustable stops 41 and 42 adjusted thereon so that as either tool approaches a predetermined zone, a stop surface 40 of one of the stop members 41 or 42 will engage the stop surface 39 on the arm 42 and further movement of the tool and the cross slide will impart axial movement to the rod 29 to effect the actuation of the dial indicator 51, for accurately indicating the position of the cross slide and the tool thereon. When the movement transmitted to the rod by the cross slide 12 is in the direction as indicated by the arrow 81, as shown in Fig. 4, the bell crank lever 63 is oscillated and actuates the dial indicator 51, and when the movement imparted to the rod by the cross slide 12 is in the opposite direction, indicated by the arrow 82, the bell crank element 62 is oscillated and actuates the dial indicator 51. Thus, the dial indicator stop device 10 serves to accurately indicate the position of the cross slide 12 and the tools thereon when the tools arrive in predetermined zones in response to movement of the tools and the cross slide in either direction.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for indicating the position of a reciprocable body as it is moved into predetermined zones in opposite directions comprising a housing fixed to one of a pair of relatively reciprocable bodies, a rod supported in said housing for axial movement and having a pair of stop surfaces engageable with abutments on the other body in response to relative reciprocation of said bodies, means for yieldably maintaining said rod in a predetermined position in said housing, an indicator supported by said housing, and a pair of oscillatable bell crank members interconnecting said rod and said indicator for actuating said indicator in response to reciprocation of said rod relative to said housing in opposite directions.

2. A device for indicating the position of a reciprocable body as it is moved into predetermined zones in opposite directions comprising a housing fixed to one of a pair of relatively reciprocable bodies, a rod supported in said housing for axial movement, an arm on said rod having a pair of stop surfaces engageable with abutments on the other body in response to relative reciprocation of said bodies, means for yieldably maintaining said rod against axial movement and in a predetermined position, an indicator supported by said housing and having a reciprocable actuating member, a pair of oscillatable bell crank motion-transmitting members interconnecting said rod and said indicator for imparting movement to said actuating member in response to reciprocation of said rod relative to said housing in opposite directions, and means for rotating said rod to swing the arm thereon into and out of alignment with said stop surfaces on said other body member.

3. A device for indicating the position of a cross slide on a lathe as it is moved into predetermined zones in opposite directions comprising a supporting member fixed to a base on which said cross slide is mounted, a rod mounted on said supporting member for axial movement and having a pair of opposed spaced shoulders, means on said rod having a pair of stop surfaces engageable with stops on the cross slide in response to reciprocation thereof, means for yieldably maintaining said rod against axial movement and in a predetermined position, an indicator mounted on said supporting member and having a reciprocable actuating member disposed perpendicularly of said slide, a pair of bell crank members each having a portion thereof engageable with the shoulders on said rod and another portion engageable with the reciprocable actuating member of said indicator, means for mounting said bell crank members for oscillatable movement with said portions in engagement with said shoulders on said rod and with the actuating member of said indicator, whereby said indicator is actuated in response to axial movement of said rod in either direction.

4. A dial indicator stop device for indicating the position of a cross slide on a lathe as it is moved into predetermined zones in opposite directions comprising a supporting member fixed to a base on which said cross slide is mounted, a rod mounted on said supporting member for axial movement and having a pair of opposed spaced shoulders, an arm on said rod having a pair of stop surfaces engageable with stops on the cross slide in response to reciprocation thereof, means for yieldably maintaining said rod against axial movement and in a predetermined position, an indicator supported on said supporting member and having a reciprocable actuating member disposed perpendicularly of said slide, a pair of bell crank members each having a portion thereof engageable with the shoulders on said rod and another portion engageable with the reciprocable actuating member of said indicator, means including leaf springs for mounting said bell crank members for oscillatable movement and with said end portions in engagement with said shoulders on said rod and with the actuating member of said indicator, whereby said indicator is actuated in response to axial movement of said rod in either direction, and means for oscillating said rod to and from first and second positions to swing the arm thereon into and out of alignment with said stop surfaces on said cross slide.

5. A dial indicator stop device for indicating the position of a cross slide on a lathe as it is moved into predetermined zones in opposite directions comprising a supporting member fixed to a base on which said cross slide is mounted, a rod mounted on said supporting member for axial movement and having a pair of opposed spaced shoulders, an arm on said rod having a pair of surfaces engageable with stops on the cross slide in response to relative reciprocation thereof, means for yieldably maintaining said rod against axial movement and in a predetermined position, an indicator supported on said supporting member and having a reciprocable actuating member disposed perpendicularly of said slide, a pair of bell crank members each having a portion thereof engageable with the shoulders on said rod and another portion engageable with the reciprocable actuating member of said indicator, means including leaf springs for mounting said bell crank members for oscillatable movement and with said end portions in engagement with said shoulders on said rod and with the actuating member of said indicator, whereby said indicator is actuated in response to axial movement of said rod in either direction, means for oscillating said rod to and from first and second positions to swing the arm thereon into and out of alignment with said stop surfaces on said cross slide, and means for yieldably retaining said rod in said first and said second positions.

6. In a device for indicating the position and measuring the extent of movement of one of a pair of relatively reciprocable bodies as the movable body is moved into predetermined zones, the combination of a housing fixed to one of said pair of bodies, a member supported in said housing for movement parallel to the movement of the movable body and having a pair of stop surfaces engageable with abutments on the other body in response to reciprocation of said movable body, resilient means for moving said member to a predetermined position in said housing and yieldably maintaining it therein, an indicating device supported by said housing for measuring and indicating the extent of movement of said member relative to said housing in either direction from said predetermined position, and means interconnecting said member and said indicating devices for actuating said indicating devices in response to movement of said member relative to said housing in either direction.

7. A device for indicating the position and extent of movement of one of a pair of relatively reciprocable bodies as it is moved into predetermined zones in opposite directions comprising a rod, means fixed to one of said bodies for supporting the rod for axial movement parallel to the movement of the movable body, means on said rod having a pair of stop surfaces engageable with abutments on the other body in response to reciprocation of the movable body, means on said supporting means for yieldably maintaining said rod against axial movement and in a predetermined position, indicating means mounted on said supporting means and having a reciprocable actuating member disposed perpendicular to the axial movement of said rod, and means for translating the axial movement of said rod in either direction into movement of said actuating member for actuating said indicating means.

References Cited in the file of this patent

UNITED STATES PATENTS

| | | |
|---|---|---|
| 1,323,267 | Hanson | Dec. 2, 1919 |
| 1,540,183 | Pearson | June 2, 1925 |
| 1,860,993 | Clarkson | May 31, 1932 |
| 2,518,524 | Cook | Aug. 18, 1950 |